United States Patent [19]
Johnson et al.

[11] Patent Number: 6,134,657
[45] Date of Patent: *Oct. 17, 2000

[54] METHOD AND SYSTEM FOR ACCESS VALIDATION IN A COMPUTER SYSTEM

[75] Inventors: William J. Johnson, Flower Mound; Robert Scott Keller, Grapevine; George C. Manthuruthil, Coppell; Marvin L. Williams, Lewisville, all of Tex.

[73] Assignee: International Business Machines Corporation, Armonk, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 08/083,863

[22] Filed: Jun. 28, 1993

Related U.S. Application Data

[63] Continuation of application No. 07/793,748, Nov. 18, 1991, abandoned.

[51] Int. Cl.[7] .................................................... H04L 9/00
[52] U.S. Cl. ............................................................ 713/168
[58] Field of Search ......................... 380/23, 25; 713/168

[56] References Cited

U.S. PATENT DOCUMENTS

| | | | |
|---|---|---|---|
| 4,672,572 | 6/1987 | Alsberg | 364/900 |
| 4,697,243 | 9/1987 | Moore et al. | 380/25 |
| 4,731,841 | 3/1988 | Rosen et al. | 380/23 |
| 4,956,769 | 9/1990 | Smith | 380/25 |
| 4,964,163 | 10/1990 | Berry | 380/23 |
| 4,993,068 | 2/1991 | Piosenka et al. | 380/23 |
| 5,003,595 | 3/1991 | Collins et al. | 380/25 |
| 5,007,085 | 4/1991 | Greanias et al. | 380/25 |
| 5,060,263 | 10/1991 | Bosen et al. | 380/25 |
| 5,144,659 | 9/1992 | Jones | 380/25 |

OTHER PUBLICATIONS

Computer Gaming World (Sep. 1992, vol. 98) pp. 16–17 (Amazon: Guardians of Eden Review) pp. 44–45 (Indiana Jones Review) pp. 54, 56 (Dune Review), pp. 64–65 (Top 100 Games).

*Primary Examiner*—Salvatore Cangialosi
*Attorney, Agent, or Firm*—Edward H. Duffield; Felsman, Bradley, Vaden, Gunter & Dillon, LLP

[57] ABSTRACT

A method and system for validating access to a computer system in an unobtrusive manner. A finite ordered series of substantive activities, such as icon manipulations, application invocations or file manipulations is specified and stored for future reference. Thereafter, each time access to the computer system is attempted, the initial activities of a prospective user are identified and compared to the stored finite ordered series of substantive activities. Access is validated and continued access permitted in response to a match between the prospective user's initial activities and the stored finite ordered series of substantive activities. In this manner, access to a computer system may be validated without the necessity of utilizing an explicit access/password screen which may be compromised. In one embodiment of the present invention, a selected application may be automatically invoked or a particular activity automatically executed in response to a validation of access.

7 Claims, 3 Drawing Sheets

METHOD AND SYSTEM FOR ACCESS VALIDATION IN A COMPUTER SYSTEM

This application is a continuation of application Ser. No. 07/793,748, filed Nov. 18, 1991 now abandoned.

BACKGROUND OF THE INVENTION

1. Technical Field

The present invention relates in general to the field of computer system security and in particular to a method and system for validating access to a computer system by a selected user. Still more particularly, the present invention relates to a method and system for validating access to a computer system by a selected user in an unobtrusive manner.

2. Description of the Related Art

Computer system security schemes are well known in the prior art. The most common security system employed typically utilizes a so-called "password" system which associates a specific alphanumeric character string with a particular user. Upon an attempted access of a computer system or a selected application by that user, a "password screen" is typically displayed and the user must thereafter enter the correct alphanumeric character string in order to validate his or her access.

Password systems are widely utilized in low security systems; however, they are not often utilized in more demanding situations. The display of a password screen is an indication to an unauthorized user that the entry of a password is required for entry to the system. So-called computer "hackers" have employed many different schemes to determine the proper alphanumeric character string necessary to obtain access to a password protected computer system. Obtaining physical copies of a password from the vicinity of the computer terminal or utilizing computer applications which rapidly try all possible combinations of alphanumeric character strings are but two techniques utilized by such people.

More sophisticated computer security systems utilize unique physical characteristics such as fingerprints, retina patterns or voice pattern recognizers to ensure that computer system access is restricted to selected users. Still more stringent systems utilize physical security and limit physical access to computer terminals by utilizing guards or other security systems. Such systems provide a great deal more security; however, the cost associated with the required hardware devices is quite considerable.

It should therefore be apparent that a need exists for a computer access validation system which permits user access to be selectively controlled in an unobtrusive manner while providing a level of security similar to that provided by password systems.

SUMMARY OF THE INVENTION

It is therefore one object of the present invention to provide an improved security system for use with a computer system.

It is another object of the present invention to provide an improved method and system for validating access to a computer system by a selected user.

It is yet another object of the present invention to provide an improved method and system for validating access to a computer system by a selected user in an unobtrusive manner.

The foregoing objects are achieved as is now described. A finite ordered series of substantive activities, such as icon manipulations, application invocations or file manipulations is specified and stored for future reference. Thereafter, each time access to the computer system is attempted, the initial activities of a prospective user are identified and compared to the stored finite ordered series of substantive activities. Access is validated and continued access permitted in response to a match between the prospective user's initial activities and the stored finite ordered series of substantive activities. In this manner, access to a computer system may be validated without the necessity of utilizing an explicit access/password screen which may be compromised. In one embodiment of the present invention, a selected application may be automatically invoked or a particular activity automatically executed in response to a validation of access.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
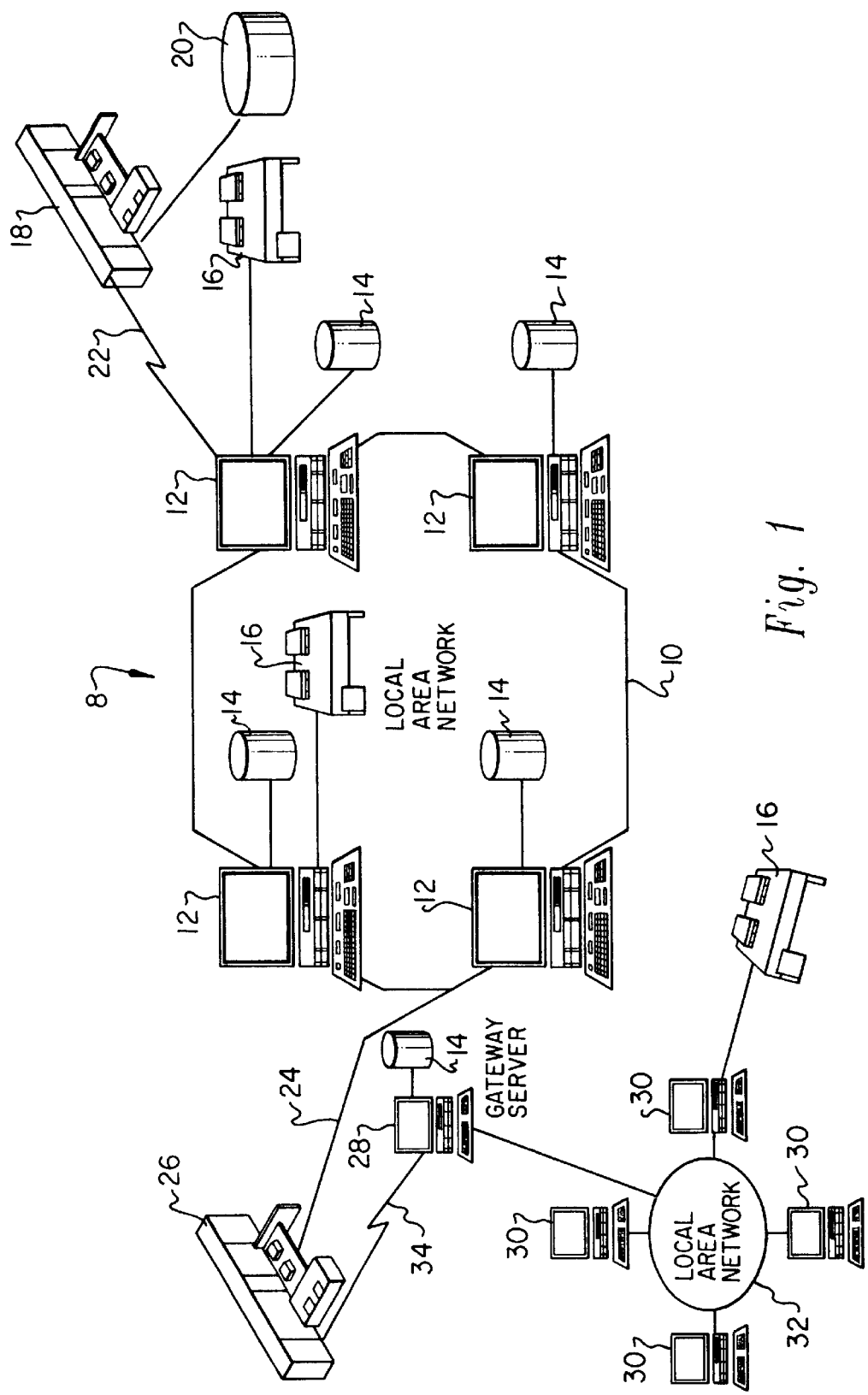
FIG. 1 is a pictorial representation of a distributed data processing system wherein access thereto may be controlled and validated utilizing the method and system of the present invention.

With reference now to the figures and in particular with reference to FIG. 1, there is depicted a pictorial representation of a distributed data processing system 8 wherein access thereto may be controlled and validated utilizing the method and system of the present invention. As may be seen, distributed data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method and system of the present invention, to store the various applications or documents which may be periodically accessed and processed by a user whose access to such applications or documents has been controlled and validated utilizing the method and system of the present invention. Further, one or more such storage devices 14 may be utilized, as will be explained in greater detail herein, to store a specified finite ordered series of substantive activities which may be utilized to validate the access of a user to the computer in accordance with the method and system of the present invention.

Still referring to FIG. 1, it may be seen that distributed data processing network 8 may also include multiple mainframe computers, such as mainframe computer 18, which may be preferably coupled to Local Area Network (LAN) 10 by means of communications link 22. Mainframe computer 18 may be coupled to a storage device 20 which may serve as remote storage for Local Area Network (LAN) 10 and may be coupled via communications controller 26 and communications link 34 to a gateway server 28. Gateway server 28 is preferably an individual computer or Intelligent Work Station (IWS) which serves to link Local Area Network (LAN) 32 to Local Area Network (LAN) 10.

As discussed above with respect to Local Area Network (LAN) 32 and Local Area Network (LAN) 10, a plurality of data objects, applications or documents may be stored within storage device 20 and controlled by mainframe computer 18, as Resource Manager or Library Service for the data objects and documents thus stored. Those skilled in the art will appreciate that it is often desirable to control access to such data objects, applications or documents by permitting only selected users to access, alter, or delete such documents.

Additionally, those skilled in the art will appreciate that mainframe computer 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California, while Local Area Network (LAN) 10 may be located within Texas and mainframe computer 18 may be located in New York.

As will be appreciated upon reference to the foregoing, it is often desirable for users within one portion of distributed data processing network 8 to access a particular data object, application or document from another portion of distributed data processing network 8. However, as discussed above, access to selected data objects, applications or documents may preferably be controlled utilizing the method and system of the present invention, such that only selected users may access, alter, or copy such data objects, applications or documents.

Figure 2:
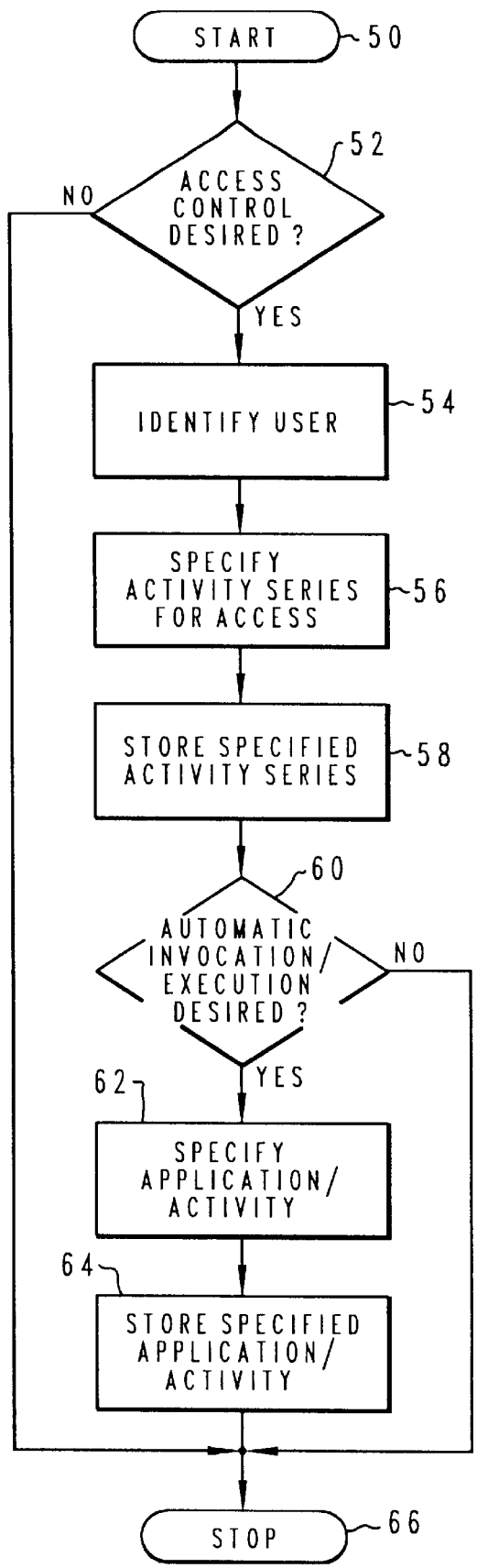
FIG. 2 is a high level flowchart illustrating the establishment of an access validation method and system in accordance with the present invention.

Referring now to FIG. 2, there is depicted a high level flowchart which illustrates the establishment of an access validation method and system in accordance with the present invention. As illustrated, the process begins at block 50 and thereafter passes to block 52 which depicts a determination of whether or not access control is desired. In the event access control to a selected computer application or system is not desired, the process merely passes to block 66 and terminates, as illustrated.

Still referring to block 52, in the event access control to a particular computer application or system is desired, the process passes to block 54. Block 54 illustrates the identification of a particular user for whom access control and validation is desired. Next, the process passes to block 56, which depicts the specifying of a finite ordered series of substantive activities which must be performed by the user in order to validate continued access to the computer system or application.

As set forth within the present specification, the term "substantive" with reference to selected activities within a computer system shall refer to activities having substantive effect within a computer system or application rather than the mere entry of an arbitrary alphanumeric key sequence, such as is typically utilized in a password process. For example, "substantive" activities may include such activities as the invocation of a particular application, the manipulation of a selected file, the manipulation of a particular icon or the utilization of a peripheral system, such as the selection of a telephone system which is associated with the computer system.

After specifying a finite ordered series of substantive activities which will be utilized to control and validate access to a computer system or computer application, in accordance with the method and system of the present invention, that specified activity series is stored, as depicted at block 58. Next, the process passes to block 60 which illustrates a determination of whether or not automatic invocation/execution is desired in conjunction with the access control and validation system of the present invention. Such automatic invocation/execution may be utilized to automatically invoke a particular application or execute a selected activity upon the occurrence of access validation in accordance with the method and system of the present invention. The application invoked or the activity executed may be totally unrelated to the specified finite ordered series of substantive activities which are utilized to validate access, as will be explained in greater detail herein. If no automatic invocation/execution is desired, the process again passes to block 66 and terminates, as illustrated.

Referring again to block 60, in the event an automatic invocation/execution is desired, the process passes to block 62 which depicts the specifying of the particular application or activity which will be automatically invoked or executed in response to a validation of access by a particular user. Thereafter, as illustrated at block 64, the specified application or activity is stored and the process then terminates, as depicted at block 66.

Figure 3:
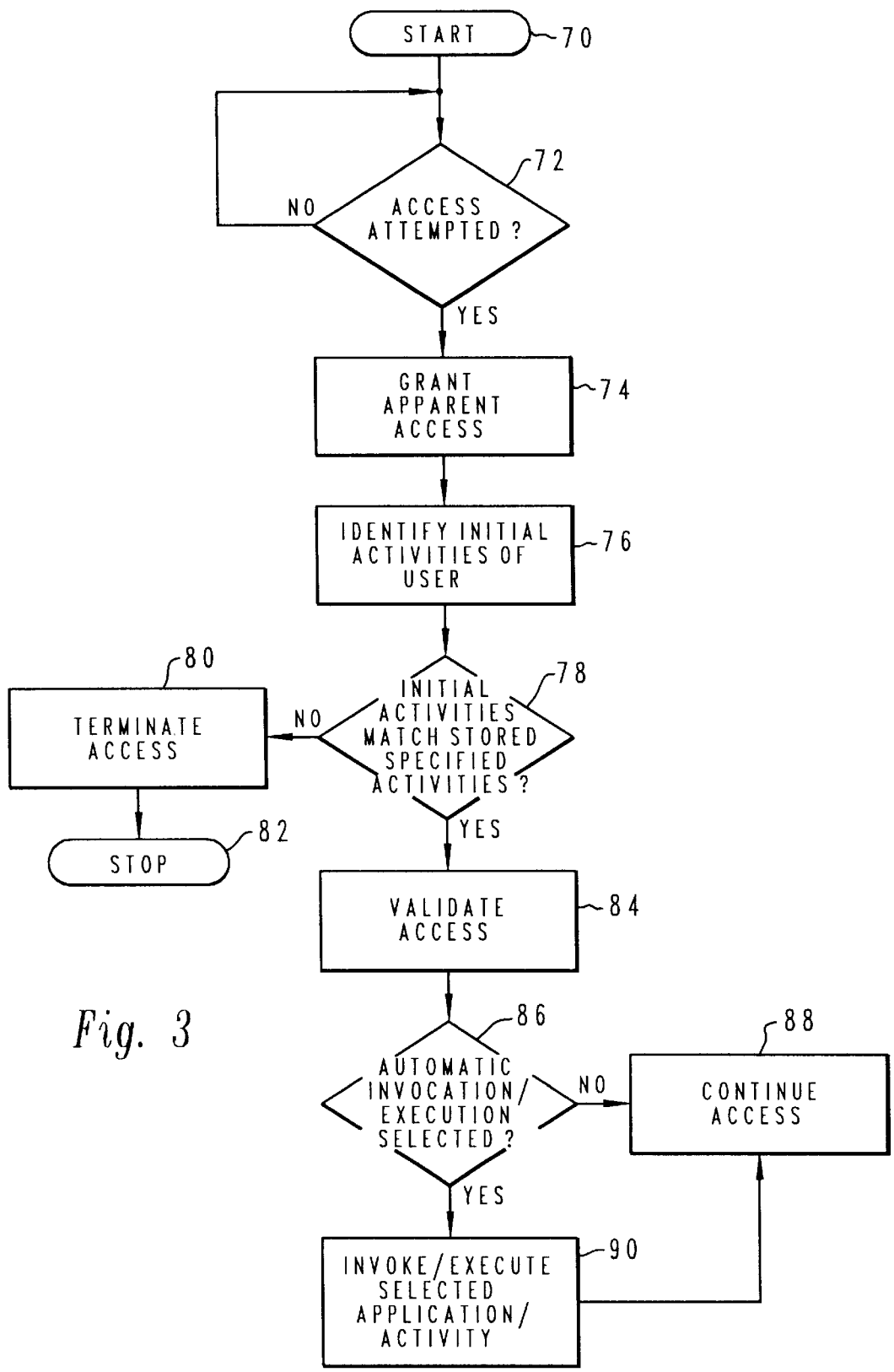
FIG. 3 is a high level flowchart illustrating the validation of access to a computer system utilizing the method and system of the present invention.

With reference now to FIG. 3, there is depicted a high level flowchart illustrating the control and validation of access to a computer system utilizing the method and system of the present invention. As illustrated, the process begins at block 70 and thereafter passes to block 72. Block 72 depicts a determination of whether or not an access to the selected computer system and/or computer application have been attempted and if not, the process merely iterates until such time as an access is attempted.

After an access to the selected computer system or computer application is attempted, as determined at block 72, the process passes to block 74. Block 74 illustrates the granting of apparent access to the computer system or computer application. Those skilled in the art will appreciate that "apparent" access to a computer system may mean total access to a limited, predetermined set of resources, such as applications, documents or the like. Thereafter, the process passes to block 76. Block 76 illustrates the identification of the initial activities of a user after apparent access to the computer system or computer application has been granted.

Next, the process passes to block 78 which illustrates a comparison to determine whether or not the initial activities of the user match the stored specified finite ordered series of substantive activities which has been previously stored as depicted at block 58 (see FIG. 2). If the initial activities of the user do not match the stored specified finite ordered list of substantive activities previously determined for a particular user, the process passes to block 80 which illustrates the termination of access by that user to the computer system or computer application and the process then terminates, as depicted in block 82.

Referring again to block 78, in the event the initial activities of a user after apparent access has been granted match the stored specified finite ordered list of substantive activities stored within the system, the process passes to block 84 which illustrates the validation of continued access to the system or application by that user. Validation of continued access to the system may mean merely permitting continued access or, alternatively, validation may permit a user to access a previously nonaccessible group of resources. Next, the process passes to block 86. Block 86 illustrates a determination of whether or not automatic invocation/execution upon a validation of access has been selected for the particular user in question. If so, the process passes to block 90 which illustrates the automatic invocation of a selected application or the automatic execution of a particular activity. In the event automatic invocation/execution is not selected or after automatically invoking a particular application or executing a selected activity, the process passes to block 88 which illustrates the continued access to the computer system or application by the user.

Upon reference to the foregoing those skilled in the art will appreciate that the Applicants herein have provided a novel method and system whereby access to a particular computer system or computer application may be controlled and validated through recognition of a series of substantive activities, or a selected process. Thus, a user wishing to gain access to confidential files stored within a Local Area Network (LAN) server, Resource Manager or Library Server may be required to perform a specific finite ordered set of substantive activities prior to being allowed to gain access.

The method and system of the present invention permits apparent access to the system to be granted to a particular user and thereafter identifies the initial activities of the user within that system. For example, a process which permits access may require a user to invoke a timer application, followed by making a phone call to a phone system, followed by dragging an arbitrary icon across a confidential files icon, followed by "triple clicking" utilizing a mouse pointer on the confidential files icon. By identifying a selected series of ordered substantive activities, such as those described above, access to the confidential files may be controlled and validated.

Further, the validation of continued access to a computer system or application may be easily utilized to invoke a selected process or execute a particular activity which may otherwise require explicit invocation. For example, a user desiring to upload a particular group of confidential files may be required to perform a totally unrelated series of substantive activities, the completion of which automatically will invoke the uploading process. A failure of the user to perform the specified finite ordered series of substantive activities can result in a termination of access or a simple denial of access to the particular files in question.

In this manner, an unauthorized user having access to a particular terminal may be denied access despite the possession of a particular password without explicitly realizing that an access control scenario has been utilized. By controlling and validating access to a computer system utilizing a series of substantive activities which may be performed by any user within the computer system, the security of the computer system or a computer application are assured in a highly unobtrusive manner.

While the invention has been particularly shown and described with reference to a preferred embodiment, it will be understood by those skilled in the art that various changes in form and detail may be made therein without departing from the spirit and scope of the invention.

What is claimed is:

1. A method for controlling access to a particular resource among a plurality of resources within a computer system, said computer system including a plurality of software applications, a plurality of files and a display system for displaying a plurality of graphically manipulatable iconic representations, said method comprising the computer implemented steps of:

specifying a finite ordered series of substantive activities which may be performed by a user within said computer system, said finite ordered series of substantive activities being unrelated to said particular resource and including at least one activity from a list including: invocation of a selected software application; manipulation of a selected file within a software application; and, graphic manipulation of a selected iconic representation;

allowing apparent access to said computer system by a selected user wherein said selected user may access each of said plurality of resources except said particular resource; and permitting said selected user to access said particular resource only in response to a performance by said selected user of said specified finite ordered series of substantive activities within said computer system wherein said unrelated nature of said specified finite ordered series of substantive activities provides security for said particular resource in an unobtrusive manner.

2. The method for controlling access to a particular resource object among a plurality of resource objects within a computer system according to claim 1, further including the step of storing an indication of said specified finite ordered series of substantive activities within said computer system.

3. The method for controlling access to a particular resource object among a plurality of resource objects within a computer system according to claim 1, further including the step of automatically invoking a specified software application within said computer system in response to a performance of said specified finite ordered series of substantive activities within said computer system.

4. The method for controlling access to a particular resource object among a plurality of resource objects within a computer system according to claim 1, further including the step of automatically executing a specified activity within said computer system in response to a performance of said specified finite ordered series of substantive activities within said computer system.

5. A system for controlling access to a particular resource among a plurality of resources within a computer system, said computer system including a plurality of software applications, a plurality of files, and a display system for displaying a plurality of graphically manipulatable iconic representations, said system comprising:

memory means associated with said computer system;

means for storing within said memory means an indication of a finite ordered series of substantive activities which may be performed by a user within said computer system, said finite ordered series of substantive activities being related to said particular resource and including at least one activity from a list including: invocation of a selected software application; manipulation of a selected file within a software application; and, graphical manipulation of a selected iconic representation;

access means for allowing access to said computer system by a selected user wherein said selected user may access each of said plurality of resources except said particular resource; and access control means for permitting said selected user to access said particular resource only in response to a performance by said selected user of said specified finite ordered series of substantive activities within said computer system wherein said elated nature of said specified fininte ordered series of substantive activities provides security for said particular resource in an unobtrusive manner.

6. The system for controlling access to a particular resource among a plurality of resources within a computer system according to claim 4, wherein said system further includes means for automatically invoking a specified software application within said computer system in response to a performance of said specified finite ordered series of substantive activities within said computer system.

7. The system for controlling access to a particular resource among a plurality of resources within a computer system according to claim 4, further wherein said system further includes means for automatically executing a specified activity within said computer system in response to a performance of said specified finite ordered series of substantive activities within said computer system.

* * * * *

UNITED STATES PATENT AND TRADEMARK OFFICE
CERTIFICATE OF CORRECTION

PATENT NO.   : 6,134,657
DATED        : October 17, 2000
INVENTOR(S)  : William J. Johnson, et al.

It is certified that error appears in the above-identified patent and that said Letters Patent is hereby corrected as shown below:

<u>Column 6,</u>
Line 62, please delete "related" and insert -- unrelated --.

<u>Column 7,</u>
Line 9, please delete " elated" and insert -- unrelated --.

Signed and Sealed this

Sixteenth Day of October, 2001

Attest:

*Nicholas P. Godici*

NICHOLAS P. GODICI
*Attesting Officer*   *Acting Director of the United States Patent and Trademark Office*